(12) United States Patent
Columbia

(10) Patent No.: US 8,534,695 B2
(45) Date of Patent: Sep. 17, 2013

(54) MULTI-USE CLEVIS/BALL COMBINATION HITCH ASSEMBLY

(76) Inventor: John R. Columbia, Brownsville, PA (US)

( * ) Notice: Subject to any disclaimer, the term of this patent is extended or adjusted under 35 U.S.C. 154(b) by 492 days.

(21) Appl. No.: 12/705,707

(22) Filed: Feb. 15, 2010

(65) Prior Publication Data

US 2010/0207360 A1    Aug. 19, 2010

Related U.S. Application Data

(60) Provisional application No. 61/152,819, filed on Feb. 16, 2009, provisional application No. 61/169,358, filed on Apr. 15, 2009.

(51) Int. Cl.
*B60D 1/01* (2006.01)

(52) U.S. Cl.
CPC .................................... *B60D 1/01* (2013.01)
USPC ............ 280/504; 280/511; 280/514; 280/515

(58) Field of Classification Search
USPC ........................ 280/504, 511, 514, 515, 490.1
See application file for complete search history.

(56) References Cited

U.S. PATENT DOCUMENTS

| | | | | |
|---|---|---|---|---|
| 2,847,232 A * | 8/1958 | Graham | ...... | 280/490.1 |
| 3,269,751 A * | 8/1966 | Whattoff | ...... | 280/482 |
| 3,393,924 A * | 7/1968 | Silver | ...... | 280/461.1 |
| 3,400,949 A * | 9/1968 | Kendall | ...... | 280/490.1 |
| 3,522,958 A * | 8/1970 | Lusignan | ...... | 280/511 |
| 3,655,221 A * | 4/1972 | Warner | ...... | 280/490.1 |
| 3,664,686 A * | 5/1972 | Anderson | ...... | 280/490.1 |
| 3,730,558 A * | 5/1973 | Litzenberger | ...... | 280/511 |
| 3,963,264 A * | 6/1976 | Down | ...... | 280/416.1 |
| 4,033,601 A * | 7/1977 | Lindahl et al. | ...... | 280/490.1 |
| 4,459,832 A * | 7/1984 | Avrea et al. | ...... | 70/14 |
| 4,596,406 A * | 6/1986 | Van Vleet et al. | ...... | 280/511 |
| 4,938,496 A * | 7/1990 | Thomas et al. | ...... | 280/511 |
| 5,131,796 A * | 7/1992 | Herum et al. | ...... | 411/222 |
| 5,419,576 A * | 5/1995 | Van Vleet | ...... | 280/507 |
| 5,860,669 A * | 1/1999 | Wass et al. | ...... | 280/416.1 |
| 5,873,595 A * | 2/1999 | Hinte | ...... | 280/504 |
| 5,915,714 A * | 6/1999 | Bell et al. | ...... | 280/456.1 |
| 6,406,052 B1 * | 6/2002 | Bale | ...... | 280/507 |
| 6,764,092 B1 * | 7/2004 | Greaves, Jr. | ...... | 280/494 |
| 7,347,441 B2 * | 3/2008 | Rosario | ...... | 280/507 |
| 2003/0006581 A1 * | 1/2003 | Moss et al. | ...... | 280/416.1 |
| 2004/0084877 A1 * | 5/2004 | Smith | ...... | 280/490.1 |
| 2004/0201201 A1 * | 10/2004 | Causey, Jr. | ...... | 280/511 |
| 2006/0097483 A1 * | 5/2006 | White | ...... | 280/511 |
| 2006/0214391 A1 * | 9/2006 | Columbia | ...... | 280/491.5 |
| 2007/0176397 A1 * | 8/2007 | Doubet et al. | ...... | 280/515 |
| 2008/0164678 A1 * | 7/2008 | White | ...... | 280/504 |
| 2008/0179861 A1 * | 7/2008 | Columbia | ...... | 280/477 |
| 2009/0108567 A1 * | 4/2009 | Robinson | ...... | 280/504 |
| 2009/0184492 A1 * | 7/2009 | Teichrob et al. | ...... | 280/451 |
| 2009/0302574 A1 * | 12/2009 | Columbia | ...... | 280/507 |

* cited by examiner

*Primary Examiner* — Paul N Dickson
*Assistant Examiner* — Maurice Williams
(74) *Attorney, Agent, or Firm* — The Webb Law Firm

(57) ABSTRACT

A hitch assembly includes a housing bracket having side members and a connecting member. A lower platform is attached to the housing bracket such that a cavity is formed between the lower platform and the connecting member. An L-shaped upper platform is configured to engage the cavity. A mounting bracket is connected to the housing bracket and has at least one adjustment aperture.

22 Claims, 18 Drawing Sheets

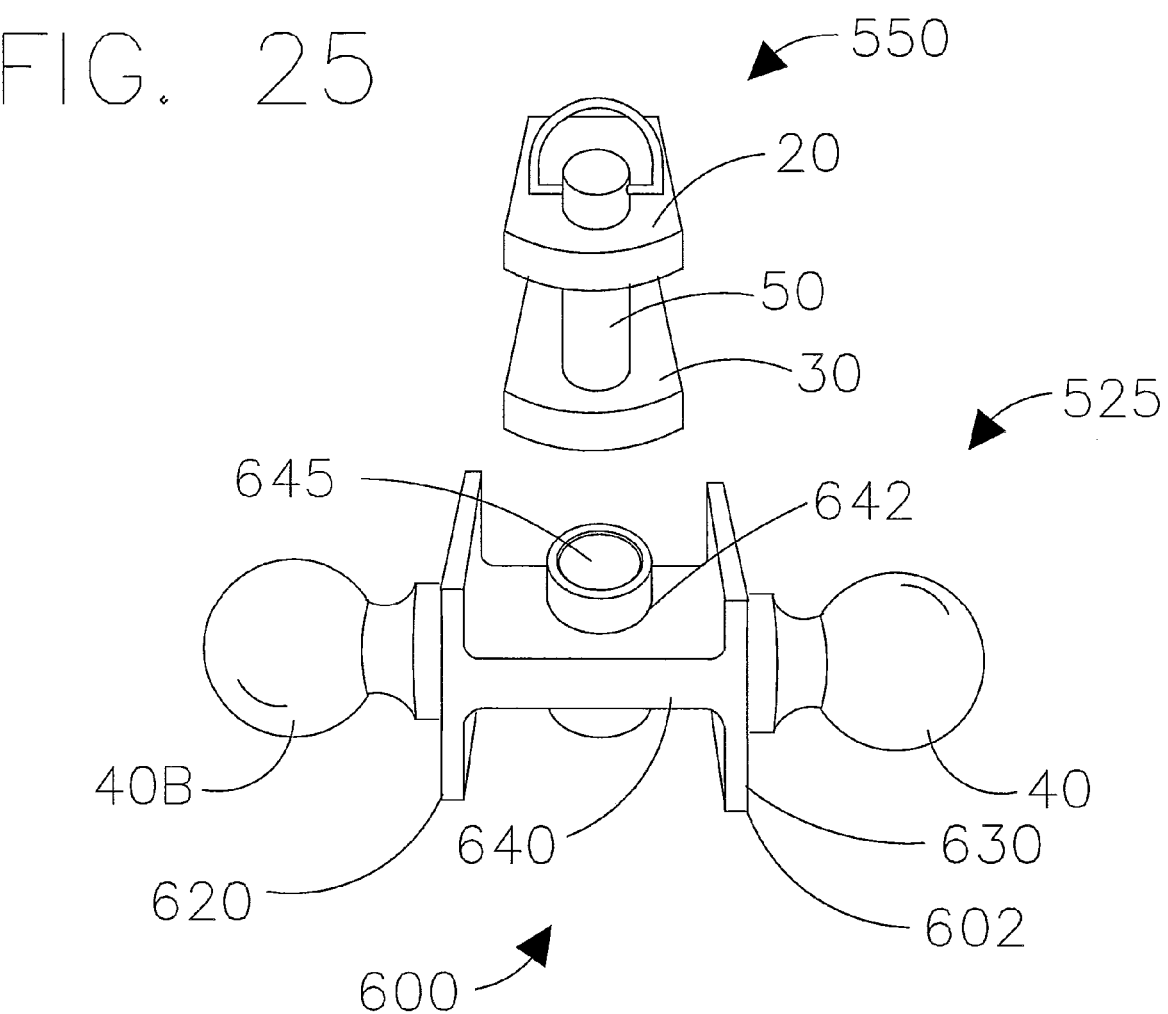

MULTI-USE CLEVIS/BALL COMBINATION HITCH ASSEMBLY

CROSS REFERENCE TO RELATED APPLICATIONS

This application claims priority to U.S. Provisional Application No. 61/152,819, filed Feb. 16, 2009, and also U.S. Provisional Application No. 61/169,358, filed Apr. 15, 2009, both of which applications are herein incorporated by reference in their entirety.

BACKGROUND OF THE INVENTION

1. Field of the Invention

The present invention relates generally to trailer hitch accessories and, more particularly, to a multi-use clevis/ball combination hitch assembly.

2. Technical Considerations

In recent years, the number, variety and type of accessories designed to engage a hitch receiver on a vehicle have increased significantly. In the current art, however, the majority of hitch-mounted products are designed to only perform a single task or purpose. For example, an industry-standard ball mount made to engage a hitch receiver includes a tow ball for coupling and towing a trailer, but precludes one from being able to utilize the ball mount for coupling a trailer with a lunette/pintle ring configuration, while a clevis mount hitch can not easily or conveniently be used as a tow ball hitch. In addition, while some consumers need an adjustable hitch to adjust the height of the tow ball, other consumers desire a hitch-mounted tow hook, shackle or tow ring to attach a recovery/tow strap. In rare instances, though, are products multifunctional, and, thus, consumers have historically been economically disadvantaged by having to purchase multiple, separate products to perform different tasks.

Additionally, some hitch products have been useful for certain market segments, industries, or applications but impracticable and inconvenient to use for other applications. For example, an industry-standard ball mount is a common product for towing a boat or utility trailer, whereas a pintle/ball combination hitch is primarily used for towing construction-type trailers. A clevis-type mount with pin is a hitch used predominantly in the agriculture industry.

As a result of having multiple hitch-mounted products to perform different tasks, owners must store or stow their hitch-mounted accessories that are not in use. This situation presents both an inconvenience and potential safety hazard. If products are stored in a house, basement, garage, shed, etc., then they may not be easily located and/or readily available for use when necessary. If they are kept in the bed of a truck, then they are susceptible to being stolen. Consequently, many individuals keep their hitch accessories inside the vehicle. In addition to getting the interior of the vehicle dirty and/or greasy, unsecured heavy objects inside the vehicle can become deadly projectiles in the event of an accident or sudden stop.

Therefore, it would be beneficial to provide a hitch assembly that overcomes at least some of the shortcomings described above.

SUMMARY OF THE INVENTION

A hitch assembly comprises a housing bracket having side members and a connecting member. A lower platform is attached to the housing bracket such that a cavity is formed between the lower platform and the connecting member. An L-shaped upper platform is configured to engage the cavity. A mounting bracket is connected to the housing bracket and has at least one adjustment aperture.

A hitch assembly comprises a U-shaped housing bracket having side members and a connecting member, with at least one set of aligned apertures in the side members. An L-shaped lower platform is non-removably connected to the housing bracket such that a cavity is formed between the lower platform and the connecting member of the housing bracket. The lower platform includes a throughbore. An L-shaped upper platform is configured to removably engage the cavity, wherein the upper platform includes a throughbore. A U-shaped mounting bracket has side members and a connecting member, with the connecting member of the mounting bracket attached to the connecting member of the housing bracket. The sides of the mounting bracket include at least one set of aligned apertures. A vertical hitch shank has a plurality of apertures, wherein the mounting bracket is configured to engage the hitch shank such that the vertical position of the platform is selectively adjustable.

A hitch assembly comprises a shank having a first end and a second end. A first platform is attached to the second shank end and has a throughbore. A second platform is attached to the second shank end and has a throughbore, with the second platform spaced from the first platform such that the throughbores are aligned. A hitch device is carried on at least one of the platforms. The hitch device can be an accessory attachment assembly having a throughbore that can align with the throughbores of the first and second platforms.

BRIEF DESCRIPTION OF THE DRAWINGS

Additional advantages and details of the invention are explained in greater detail below with reference to the exemplary embodiments illustrated in the accompanying drawing figures wherein like reference symbols identify like parts throughout.

FIG. 25 is an exploded view of an alternative accessory attachment assembly.

DETAILED DESCRIPTION OF THE PREFERRED EMBODIMENTS

Figure 1:
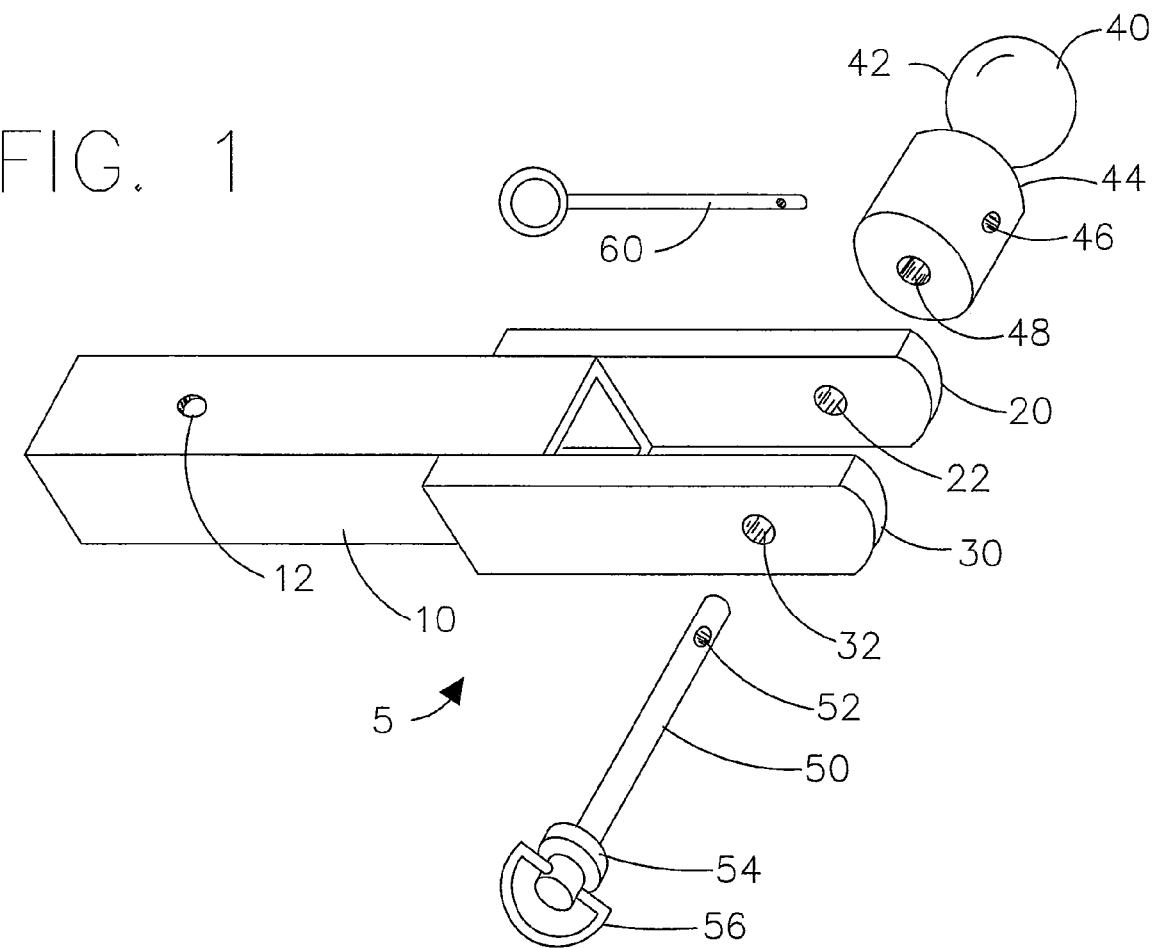
FIG. 1 is an exploded view of a clevis/ball combination hitch assembly of the invention.

As used herein, spatial or directional terms, such as "top," "bottom," "left," "right," "over," "under," "front," "rear," and the like, relate to the invention as it is shown in the drawing figures. However, it is to be understood that the invention can assume various alternative orientations, and, accordingly, such terms are not to be considered as limiting. Further, all numbers expressing dimensions, physical characteristics, and so forth, used in the specification, figures, and claims are to be understood as being modified in all instances by the term "about." Accordingly, unless indicated to the contrary, the numerical values set forth in the following specification, figures, and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. The dimensions set forth on the accompanying drawing figures are for one exemplary embodiment of the invention and it is to be understood that the invention is not limited to the specifically disclosed dimensions. All references and applications referred to herein are to be understood as being incorporated by reference in their entirety.

The multi-use clevis/ball combination hitch assemblies described and illustrated in the drawings are intended to be illustrative and not exhaustive.

Referring to FIG. 1, there is shown a view of a first embodiment of the inventive multi-use clevis/ball combination hitch assembly referred to by the Reference Number 5. Multi-use clevis/ball combination hitch assembly 5 can be mounted to a vehicle's receiver hitch (not shown) by hitch attachment shank 10 and secured to the vehicle's receiver with a standard hitch pin (not shown) inserted through shank apertures 12.

Multi-use clevis/ball combination hitch assembly's shank 10 also serves as a mount for attaching dual symmetrical platforms 20 and 30. Upper platform 20 contains throughbore 22 and lower platform 30 contains throughbore 32. Throughbores 22 and 32 are aligned with each other permitting clevis pin 50 to be inserted through both throughbores 22 and 32. Clevis pin 50 comprises throughbore 52, and may include retaining ring stop 54, and handle 56. Tow ball 40 comprises a ball sphere 40 and base 44. Base 44 contains horizontal throughbore 46 and vertical bore 48. Vertical bore 48 extends into tow ball base 44 at a distance spaced beyond horizontal throughbore 46 to permit clevis pin 50 to be inserted into tow ball base vertical bore 48 until clevis pin throughbore 52 is aligned with tow ball base horizontal throughbore 46 permitting safety pin 60 to be inserted through both tow ball base 44 continuing through clevis pin throughbore 52 and completely through tow ball base 44 thereby securing clevis pin 50 to tow ball 40.

As shown, when clevis pin 50 is inserted through lower platform 30, then upper platform 20 and into tow ball 40 and safety pin 60 engaged to complete the coupling, tow ball 40 and clevis pin 50 are rotatable.

In another embodiment, as can be easily recognized and appreciated by one skilled in the art, tow ball base 44 may be permanently attached to upper platform 20, as by welding, resulting in tow ball 40 being non-rotatable as well as clevis pin 50 being non-rotatable when engaged and pinned to tow ball 40 with safety pin 60. In addition, although all bores and pins are shown as round and/or cylindrical in shape, the bores and pins may be of any shape such as square, oval, hexagonal, polygonal, etc. In addition, tow ball base vertical bore 48 may contain an internal thread convolution with a portion of clevis pin 50 containing a corresponding external thread convolution to facilitate a cooperating threaded connection. Additionally, clevis pin throughbore 52 and/or tow ball base horizontal throughbore 46 may be elongated bores to facilitate easier alignment for inserting safety pin 60. Safety pin 60 may be comprised of a pin and safety clip, detent pin, positive locking pin, or any other appropriate type of retraining pin. In addition, tow ball 40 need not be of a particular ball sphere size, but the invention encompasses multiple size tow balls, as well as a tow ball base of an interchangeable hitch ball assembly.

Figure 2:
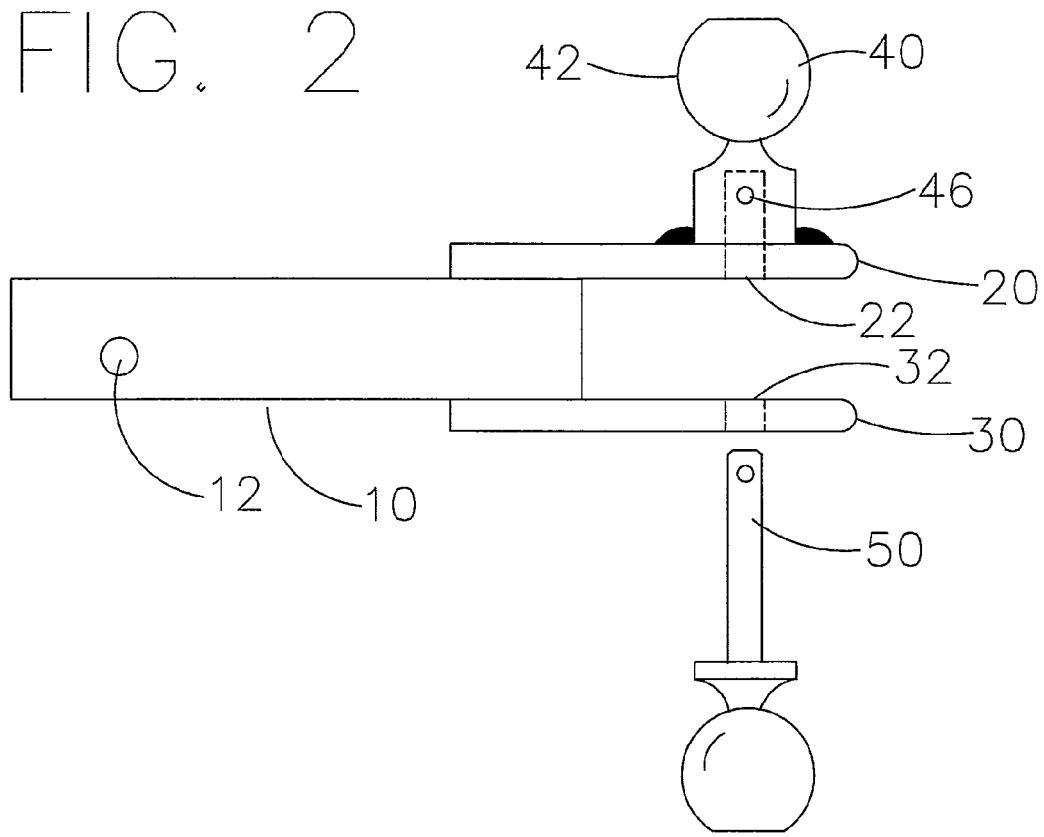
FIG. 2 is a side view of a clevis/double tow ball combination hitch assembly of the invention.
Figure 3:
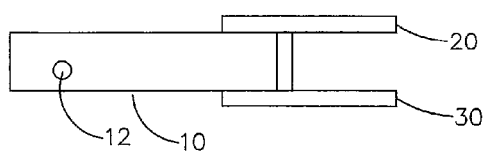
FIGS. 3-8 are side views of various hitch assemblies incorporating features of the invention.
Figure 4:
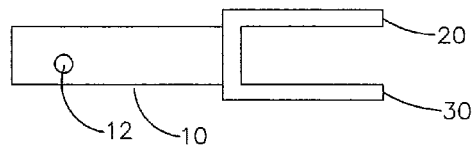
Figure 5:
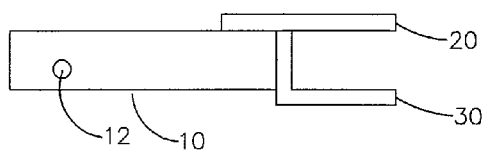
Figure 6:
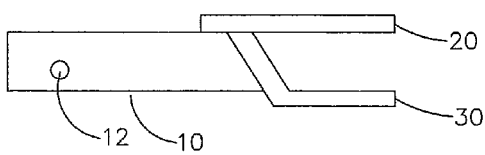
Figure 7:
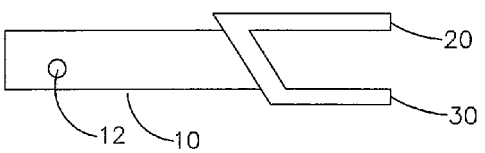
Figure 8:
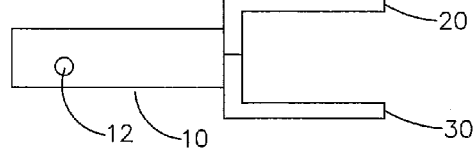

In another embodiment, when multi-use clevis/ball combination hitch assembly 5 is used in conjunction with the tow ball/clevis pin described and illustrated at FIG. 51 of this inventor's provisional Patent Application No. 61/102,099 and U.S. patent application Ser. No. 12/570,121, entitled, "Maximum Security/Maximum Versatility Ball Mount Assembly" (herein incorporated by reference in their entirety) the assembly results in a multi-use clevis/double tow ball combination hitch assembly as shown in FIG. 2.

In other embodiments, platforms 20 and 30 need not be symmetrical platforms, but the invention applies to any configuration utilizing dual platforms. Referring to FIGS. 3 through 8, there are shown as illustrative examples, and not as limiting embodiments, alternate configurations of a hitch assembly comprising dual platforms.

Figure 9:
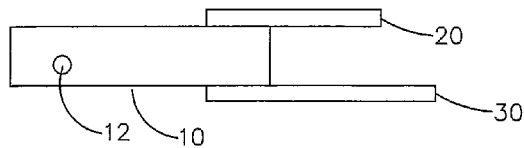
FIG. 9 is a side view of a dual platform hitch assembly.

As shown in FIG. 9, the invention also applies to a dual platform assembly wherein one platform extends rearward of the other platform as described in this inventor's co-pending utility patent application Ser. Nos. 11/732,117 and 11/372,748 entitled, "Multi-Task Trailer Hitch Assembly" (herein incorporated by reference in their entirety).

Figure 10:
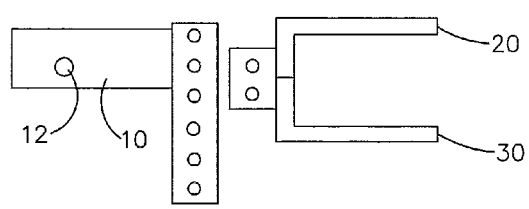
FIG. 10 is a side view of a height adjustable clevis mount hitch assembly of the invention.

Referring to FIG. 10, there is shown the invention as applied to a clevis mount hitch that is height-adjustable on a vertical clevis mount shank/support, rather than fixed-position dual clevis platforms. The holes on the clevis portion (right side of FIG. 10) can be selectively aligned with holes on the shank portion (left side of FIG. 10) and secured by a conventional locking mechanism, such as, a nut and bolt or cotter key, such that the height of the clevis portion is selectively adjustable.

Figure 11:
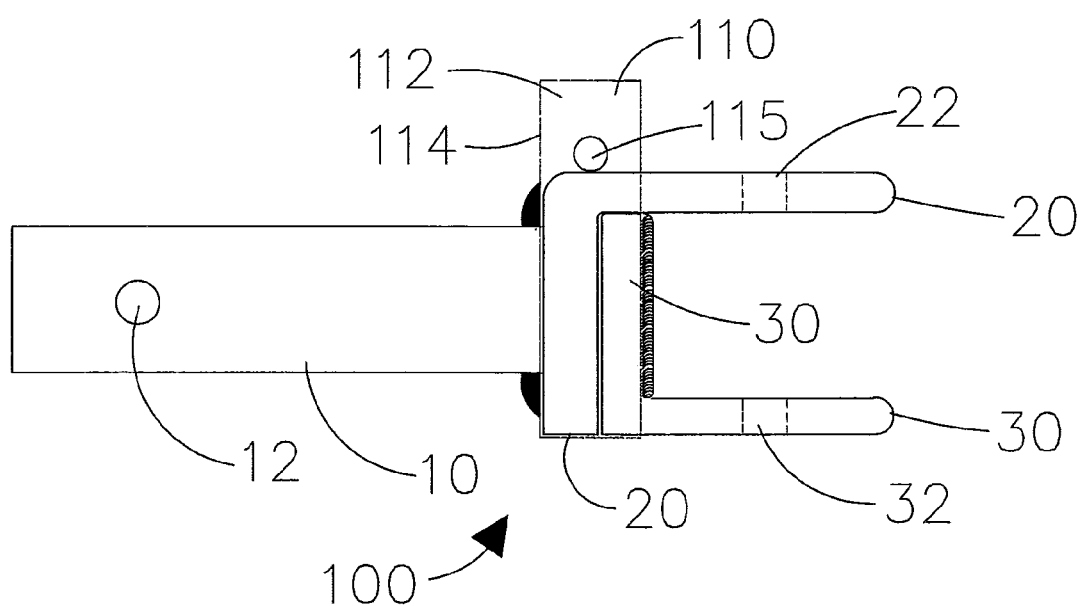
FIG. 11 is a side view of another clevis/ball combination hitch assembly of the invention.
Figure 12:
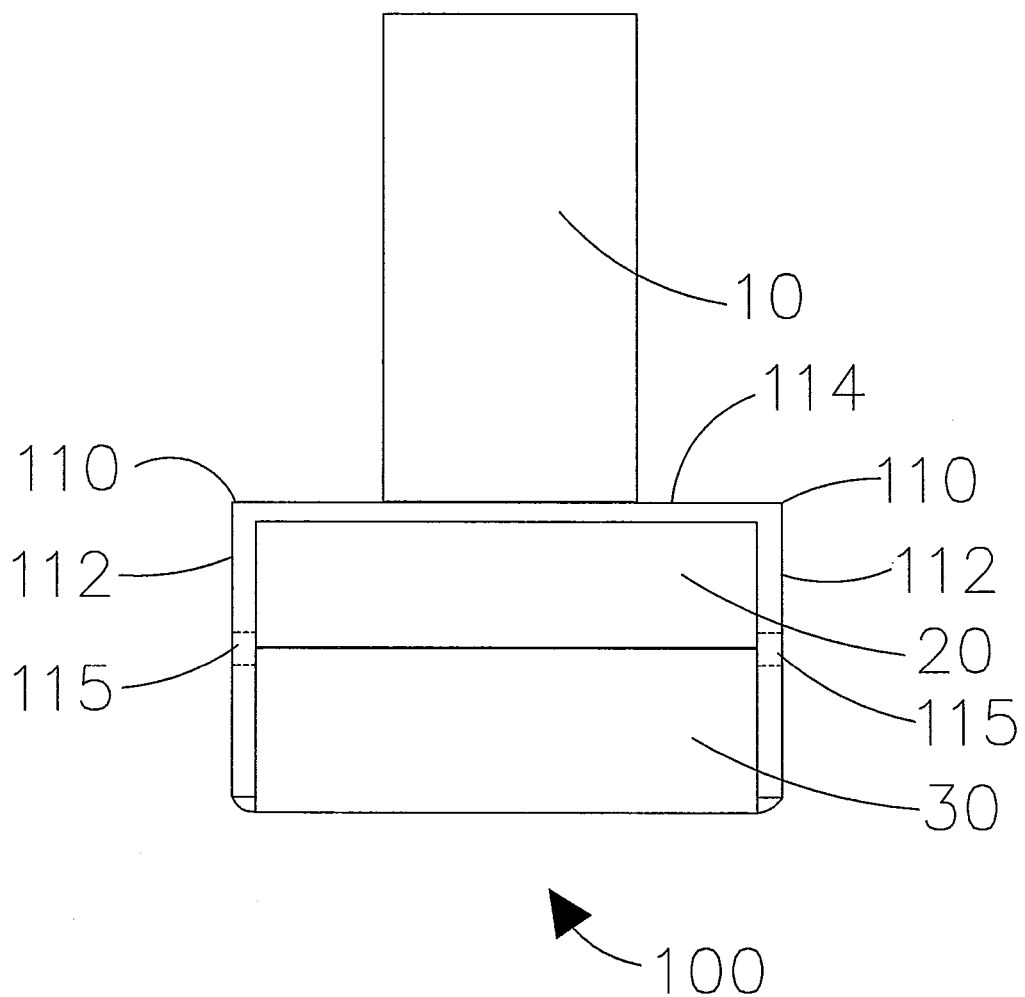
FIG. 12 is a top view of the hitch assembly of FIG. 11.

Referring to FIG. 11, there is shown an another embodiment of the multi-use clevis/ball combination hitch assembly referred to by the Reference Number 100. In this embodiment, upper platform 20 is separable from assembly 100. For example, upper platform 20 can be part of an L-shaped member, with one leg of the "L" configured to releasably engage a cavity, as described below. Lower platform 30 is attached to rear portion of U-shaped housing bracket 110 (represented by dotted lines) as by welding. Lower platform 30 can also be L-shaped. U-shaped housing bracket 110 includes side members 112 and connecting member 114, as best seen in FIG. 12. FIG. 12 is a top plan view of assembly 100. Lower platform 30 is welded to sides 112 of housing bracket 110 leaving a cavity between forward portion of platform 30 and U-shaped housing bracket connecting member 114. That is, a cavity is formed between the vertical leg of the L-shaped lower member and the connecting member 114. U-shaped housing bracket 110 also contains at least one set of aligned apertures 115 for inserting a standard hitch pin and retaining clip (not shown) to hold or lock the upper platform 20 in place. Upper platform 20 is attached to the assembly by inserting a leg of the "L"-shaped platform 20 between forward portion of lower platform 30 (vertical leg of the L-shaped member) and U-shaped housing bracket connecting member 114. Upper platform 20 is lowered into the cavity until seated on top of lower platform 30. Upper platform 20 is then secured in place and to assembly 100 by inserting standard hitch pin and clip (not shown) through apertures 115 in U-shaped side members 112. Of course, the lower platform 30 need not be a single member but can have a horizontal member forming the platform 30 and a vertical member defining the cavity.

Figure 13:
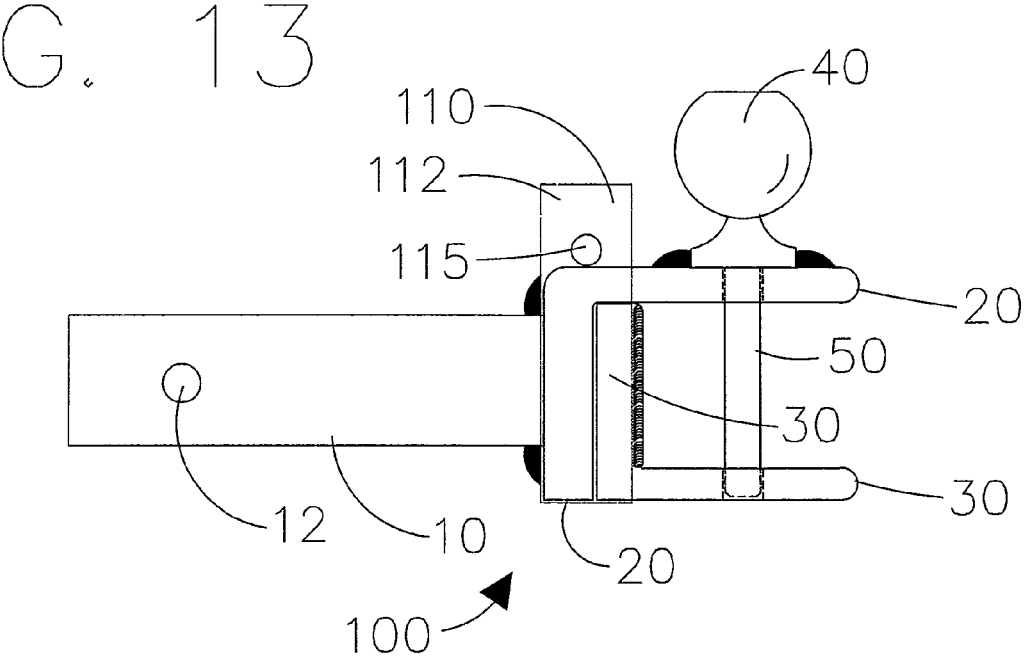
FIG. 13 is a side view of the hitch assembly of FIG. 11 including a hitch pin and tow ball.
Figure 14:
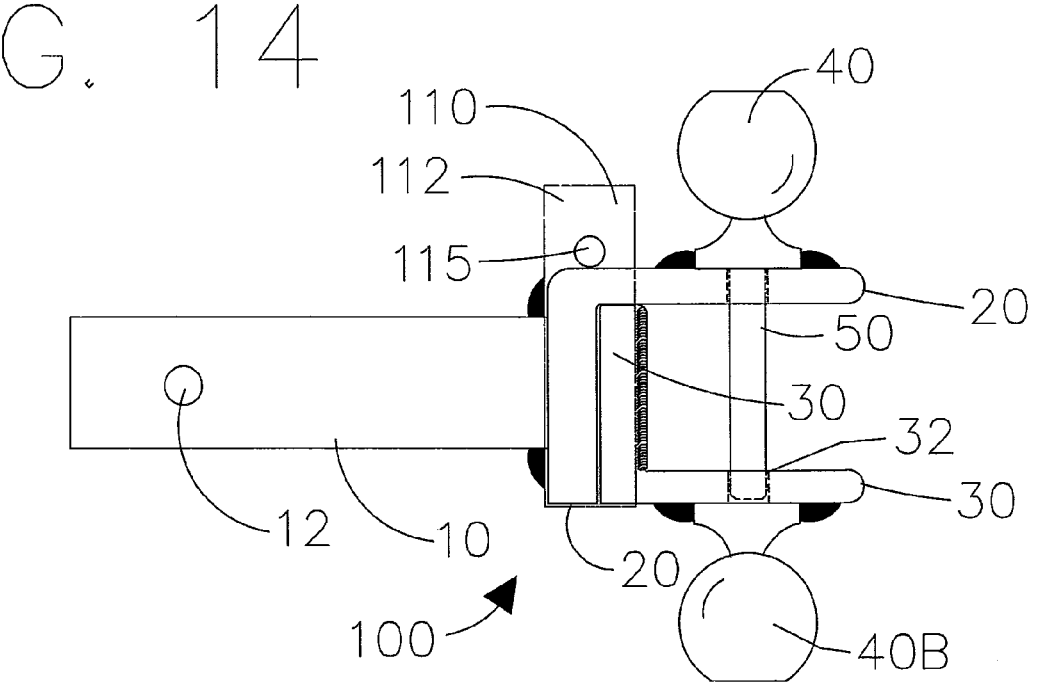
FIG. 14 is a side view of the hitch assembly of FIG. 13 including a second tow ball.

Referring to FIG. 13, assembly 100 is shown with clevis/ball hitch pin 50 of FIG. 2 welded to upper platform 20. Top of clevis/ball hitch pin 50 may comprise a tow ball and be welded to top surface of upper platform 20. Bottom of clevis/ball hitch pin 50 may be of a length to abut top of lower platform 30 or, as shown, be recessed into aperture 32 of lower platform 30 as shown by dotted lines. Alternatively, tow ball 40 and clevis/ball hitch pin 50 may be two separate elements welded to upper platform 20. As shown in FIG. 14, assembly 100 may further include a second tow ball 40B of a different size from the tow ball sphere size of tow ball 40 attached to the underside of lower platform 30 as by welding.

Figure 15:
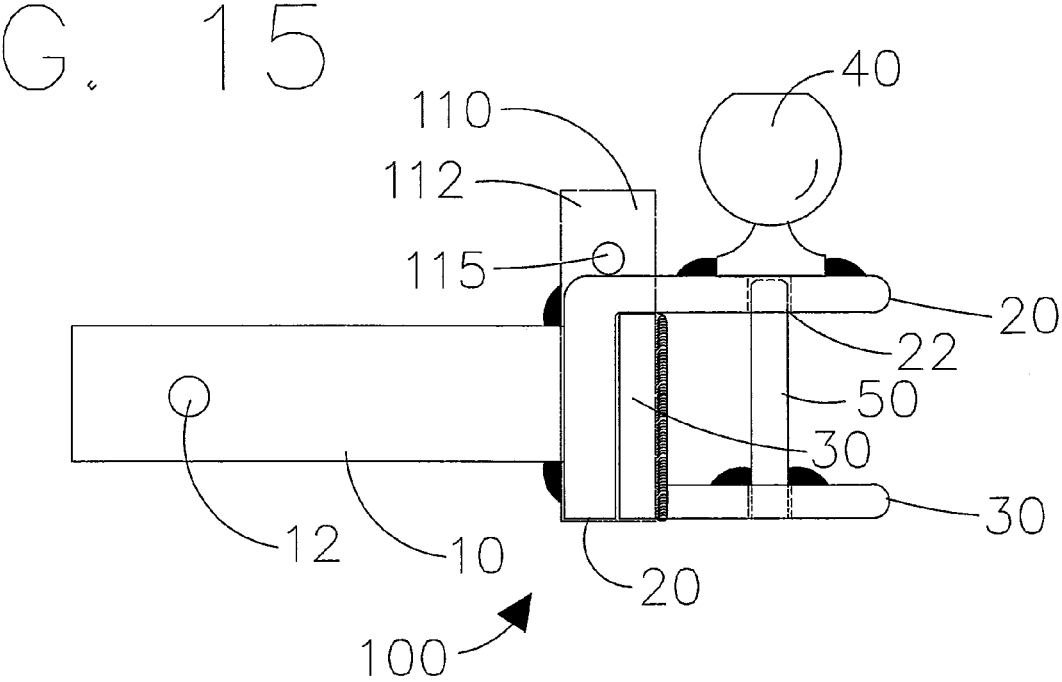
FIG. 15 is a side view of another hitch assembly embodiment of the invention similar to FIG. 13.
Figure 16:
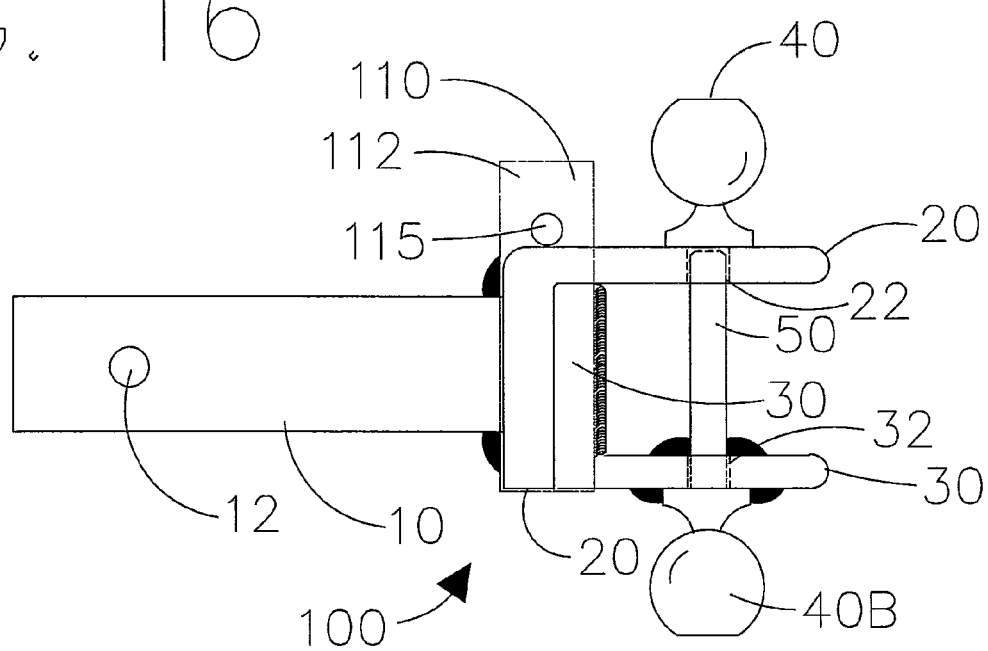
FIG. 16 is a side view of a combination hitch assembly of the invention similar to FIG. 15 but including a second hitch ball.

As shown in FIG. 15, tow ball 40 may be welded to upper platform 20, and clevis/ball hitch pin 50 may be a separate pin welded to lower platform 30, with upper portion of clevis/ball hitch pin 50 either abutting underside of upper platform 20, or be recessed into aperture 22 of upper platform 20 as shown. Alternatively, as shown in FIG. 16, clevis/ball hitch pin 50 may be a component element of hitch ball 40B and inserted through aperture 32 of lower platform 30 and attached to lower platform 30 as by welding.

Figure 17:
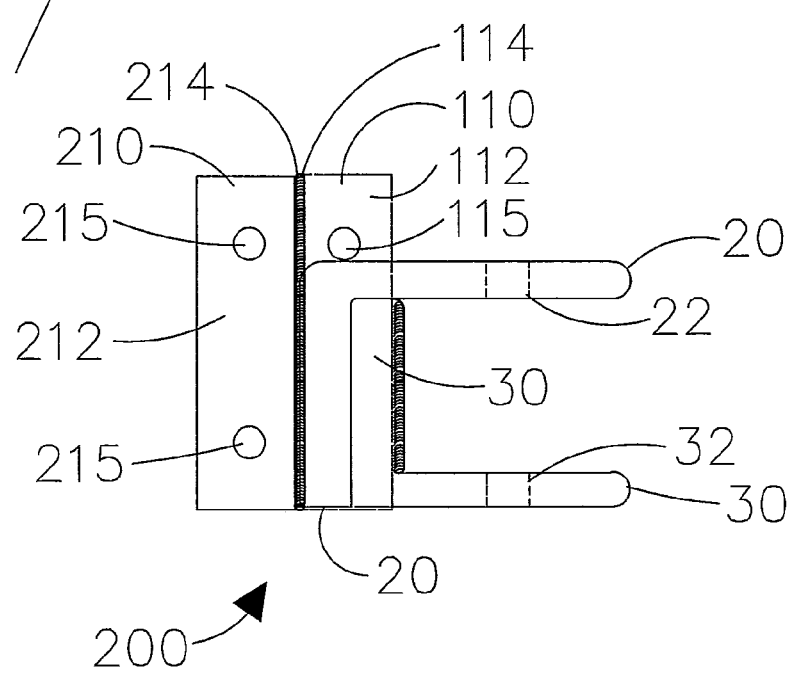
FIG. 17 is a side view of another hitch assembly of the invention.
Figure 18:
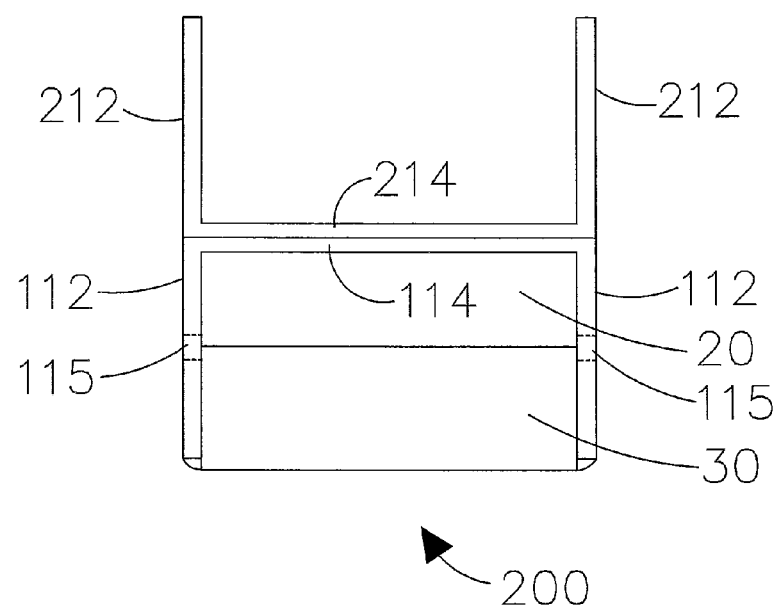
FIG. 18 is a plan view of the hitch assembly of FIG. 17.
Figure 19:
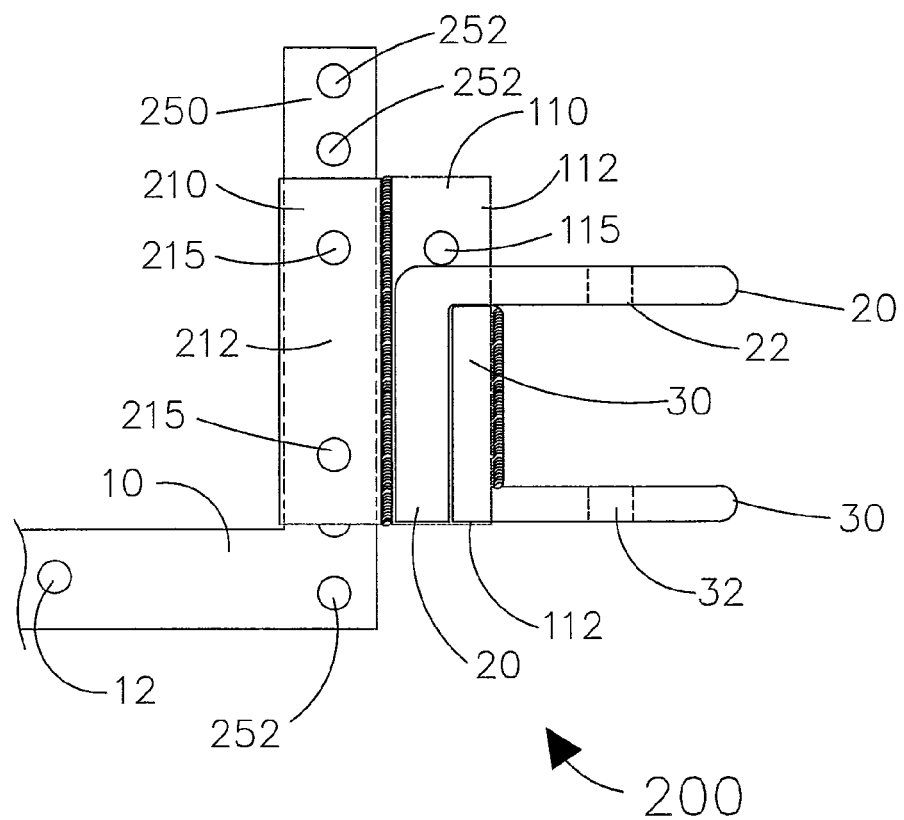
FIG. 19 is a side view of the hitch assembly of FIG. 17 attached to a vertical hitch shank.

Referring to FIG. 17, there is shown another embodiment similar to the embodiment of Assembly 100 shown in FIGS. 11 and 13 through 16, but including additional U-shaped mounting bracket 210 attached to and abutting U-shaped housing bracket 110. U-shaped mounting bracket 210 has side members 212 and connecting member 214 (as best seen in FIG. 18). FIG. 18 is a top plan view of assembly 200. Connecting member 214 of U-shaped mounting bracket 210 and connecting member 114 of U-shaped housing bracket 110 are placed back-to-back and attached together, for example, by welding. Assembly 200 can then be attached to an adjustable vertical hitch shank 250, as best seen in FIG. 19. Assembly 200 is attached to adjustable vertical hitch shank 250 by aligning apertures 215 in U-shaped mounting bracket 210 with apertures 252 in adjustable vertical hitch shank 250 and securing in place in any conventional manner, such as with standard hitch pins and clips (not shown).

Figure 20:
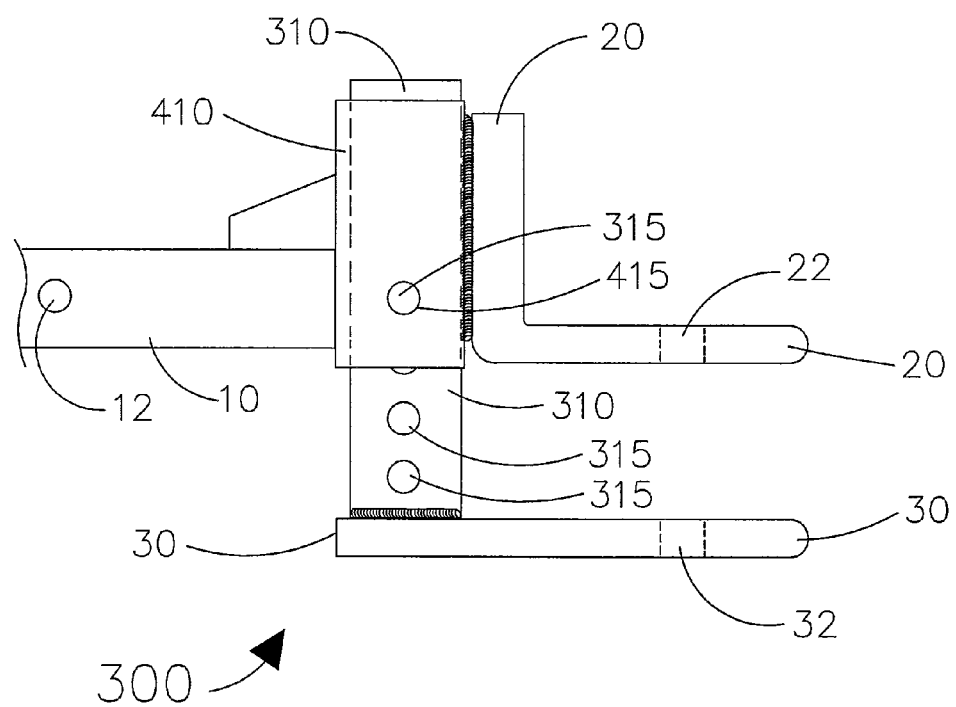
FIG. 20 is a side view of a vertically adjustable hitch assembly of the invention.

Referring to FIG. 20, there is shown another embodiment similar to the embodiment of Assembly 200 shown in FIGS. 17 through 19, but utilizing a different type of adjustable hitch. In this embodiment, hollow sleeve 410 is vertically mounted to shank 10. Hollow sleeve 410 contains apertures 415 in opposing side walls. Upper platform 20 is attached to rearward side of hollow sleeve 410 as by welding as shown. Lower platform 30 is attached, as by welding, to vertical shank 310. Shank 310 has multiple throughbores 315. Shank 310 is inserted into hollow sleeve 410 and attached to the assembly by aligning throughbores 315 in shank 310 with apertures 415 in hollow sleeve 410 and inserting standard hitch pins and retaining clips (not shown).

Figure 21:
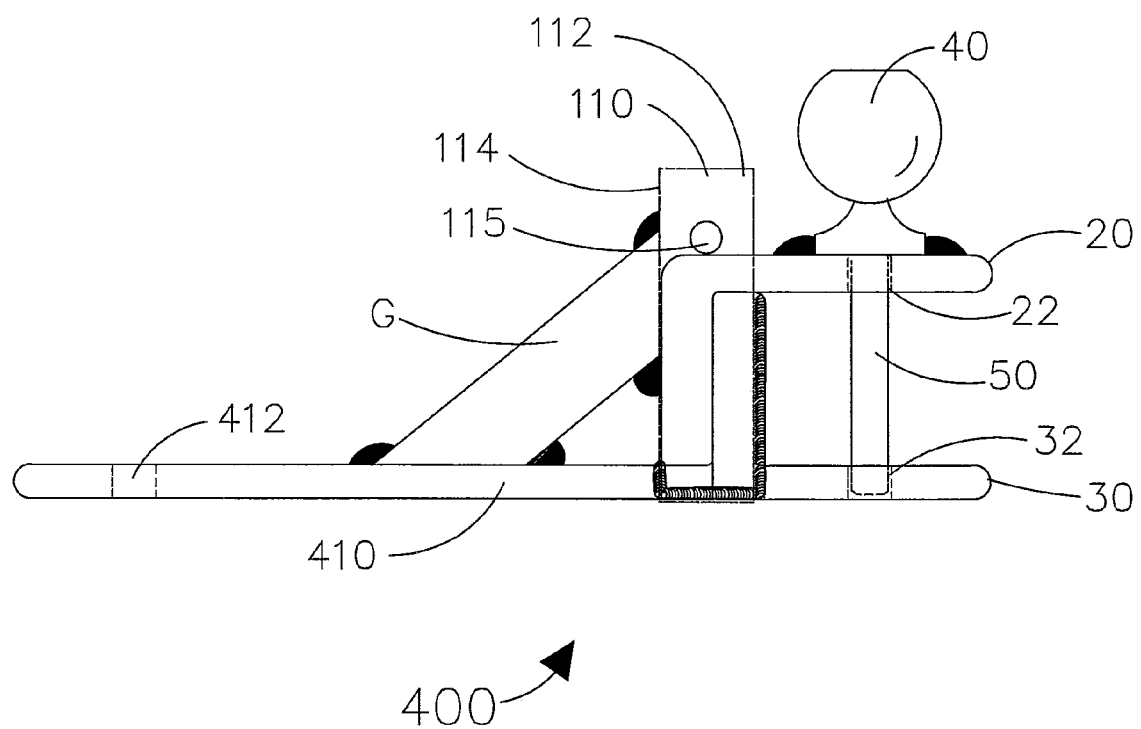
FIG. 21 is a side view of a further hitch assembly of the invention.

Referring to FIG. 21, there is shown another embodiment referred to as Assembly 400. Assembly 400 is similar to the embodiment of Assembly 100 shown in FIGS. 11 through 16, but utilizes a different attachment element to attach the assembly to the tow vehicle. In lieu of Assembly 400 comprising shank 10 for attaching the assembly to a tow vehicle's receiver, Assembly 400 is attached or bolted to a tow vehicle not equipped with a receiver hitch via throughbore 412 in attachment leg 410. In this embodiment, U-shaped housing bracket 110 is attached to attachment leg 410, rather than shank 10 as shown in FIGS. 11 through 16. In this embodiment, a gusset G may be used between the top of attachment leg 410 and forward section of U-shaped housing bracket 114 as shown.

Figure 22:
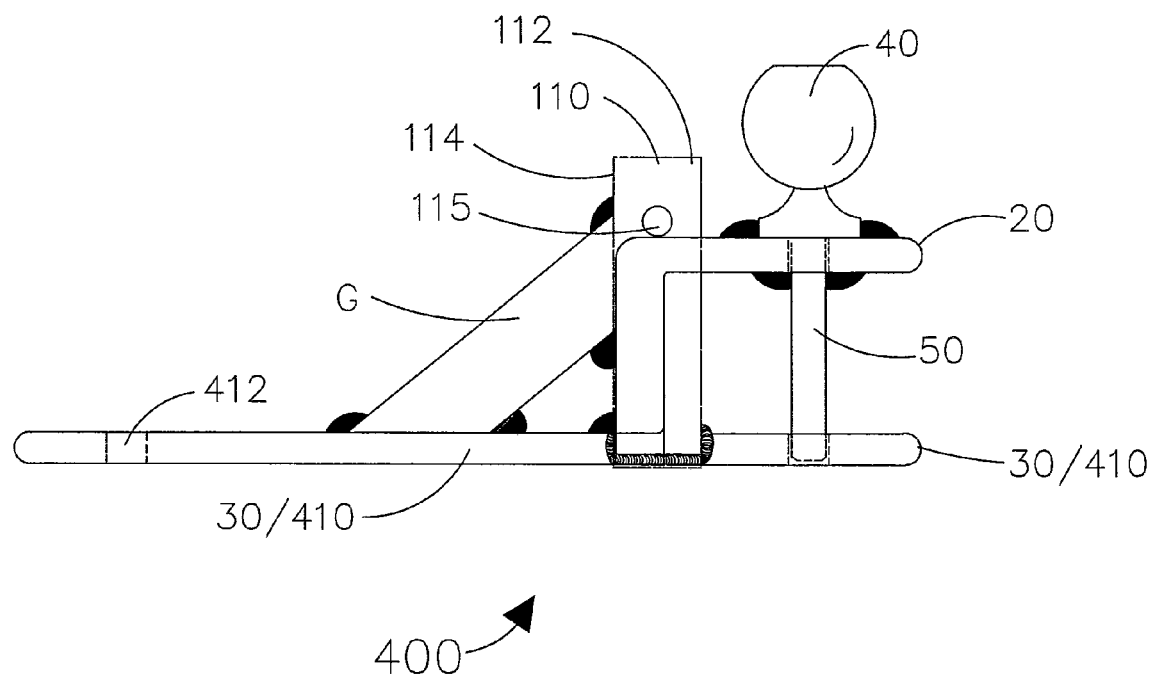
FIG. 22 is a side view of a still further hitch assembly of the invention.

Referring to FIG. 22, there is shown another embodiment similar to the embodiment of FIG. 21, but in this embodiment attachment leg 410 also serves as lower ball mount platform 30. In this embodiment, the bottom of U-shaped housing bracket 110 is attached to the top of attachment leg 410/lower ball mount platform 30, as by welding. Additionally three-sided U-shaped housing bracket 110 is modified to include a fourth sidewall at its lower portion to encapsulate a portion of upper ball mount platform 20, keeping upper ball mount platform 20 in position.

Figure 23:
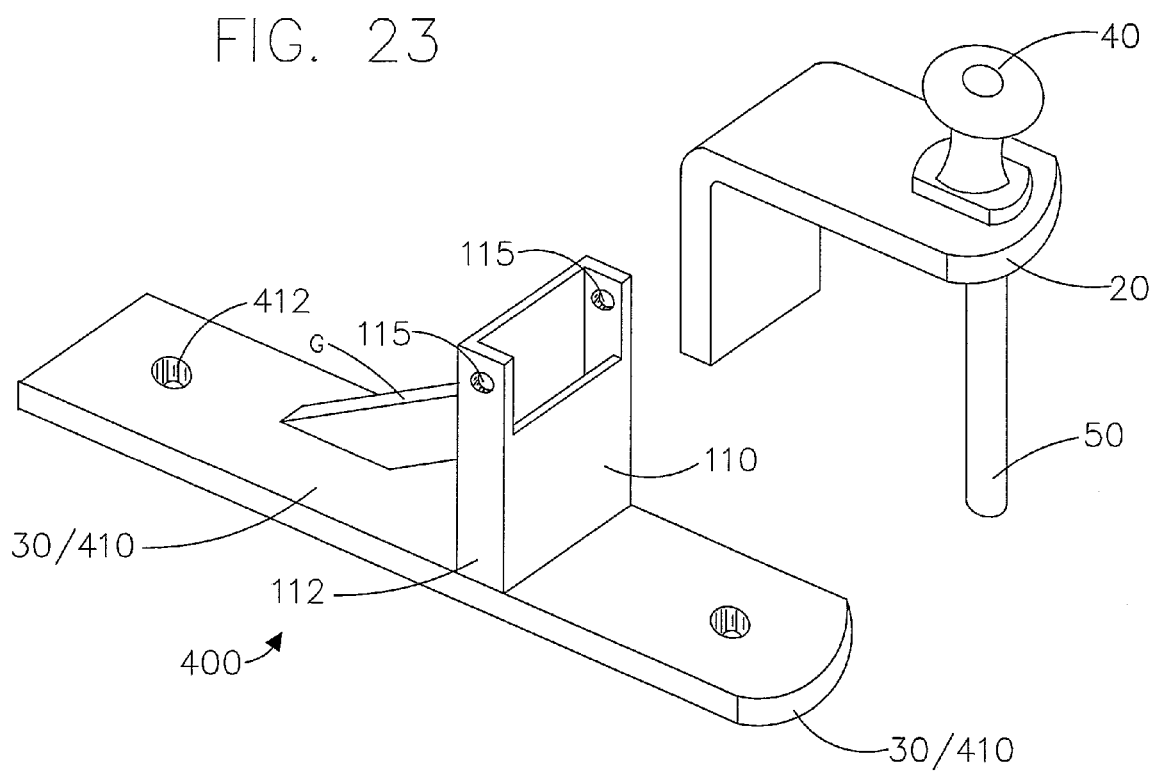
FIG. 23 is a rear perspective view of the hitch assembly of FIG. 22.

Referring to FIG. 23, there is shown a rear perspective view of the embodiment of FIG. 22.

To prevent the assemblies of FIGS. 21 through 23 from turning when torque is applied to the assemblies, the assemblies may comprise a tightening bar described as Ref Nos. 7 and 8 in co-pending application Ser. No. 11/372,748 filed on Mar. 10, 2006 and Ser. No. 11/732,117 filed on Apr. 2, 2007, and entitled, "Multi-Task Trailer Hitch Assembly."

Figure 24:
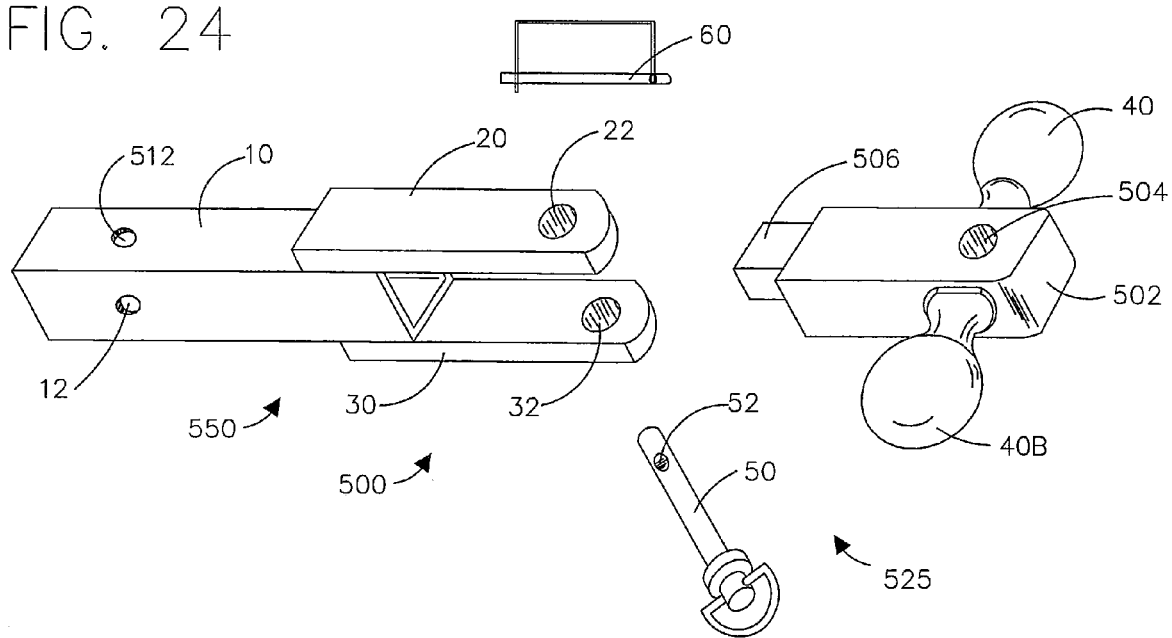
FIG. 24 is an exploded view of another hitch assembly of the invention having an accessory attachment assembly.

Referring to FIG. 24, there is shown another embodiment of the Multi-Use Clevis/Ball Combination Hitch Assembly referred to as Assembly 500. This embodiment comprises inventive accessory attachment assembly 525 and clevis/ball mount assembly 550. Accessory attachment assembly 525 comprises accessory/tow ball base 502 and at least one attachment element such as tow ball 40 as shown. Clevis/ball mount assembly 550 includes an industry standard upper ball mount platform 20 and lower ball mount platform 30 mounted on two opposing sidewalls of shank 10. An industry standard clevis/ball mount includes standard apertures 12 in opposing side walls opposite the two sidewalls to which upper ball mount platform 20 and lower ball mount platform 30 are mounted.

When the industry standard clevis/ball mount assembly is inserted into a vehicle's hitch receiver, apertures 12 are aligned with the pinning apertures in the vehicle's hitch receiver (not shown) and secured to the vehicle's hitch receiver with a standard hitch pin. When the industry standard clevis/ball mount assembly is properly installed and secured to a tow vehicle, upper ball mount platform 20 and lower ball mount platform 30 are positioned above and beneath each other, as opposed to beside each other, so that clevis pin 50 is installed and maintained in a vertical position, as opposed to a horizontal position, when inserted through apertures 22 in upper ball mount platform 20 and 32 in lower ball mount platform 30.

Clevis/ball mount assembly 550 includes additional aligned apertures 512 in shank 10. Apertures 512 are positioned on shank 10 perpendicular to, and on opposite side walls from, apertures 12. As a result of additional apertures 512, clevis/ball mount assembly 550 may be rotated and installed in and pinned to the vehicle's hitch receiver in four different positions.

Accessory/tow ball base 502 may be one piece made from solid stock, or can be comprised of component pieces. As shown in FIG. 24, accessory/tow ball base 502 serves as an attachment base for mounting tow balls, hooks, rings, shackles and/or other accessories to the assembly. Although FIG. 24 shows dual, different-sized tow balls 40/40B attached to accessory/tow ball base 502, other accessories mounted to the base are anticipated and also considered to be within the scope of this invention.

Accessory/tow ball base 502 contains throughbore 504 and insert-shank 506. Accessory/tow ball base 502 and insert shank 506 may be comprised of either hollow or solid material, or a combination of both. To attach accessory attachment assembly 525 to clevis/ball mount assembly 550, accessory attachment assembly 525 is slid between upper ball mount platform 20 and lower ball mount platform 30 on clevis/ball mount assembly 550 with insert-shank 506 on accessory/tow ball base 502 sliding into end of hollow shank 10 on clevis/ball mount assembly 550. When correctly installed, throughbore 504 in accessory/tow ball base 502 is aligned with apertures 22 on upper ball mount platform 20 and 32 on lower ball mount platform 30. Clevis pin 50 is then inserted through aperture 22 on upper ball mount platform 20, throughbore 504 in accessory/tow ball base 502, and aperture 32 on lower ball mount platform 30 and safety pin 60 inserted through clevis pin throughbore 52 to complete the multi-use clevis/ball combination hitch assembly.

As can be recognized and appreciated by one skilled in the art, the configuration of accessory attachment assembly 525 is not limited to the one described above and illustrated in FIG. 24, but, as a matter of design choice, may be any assembly configured to engage upper ball mount platform 20 and lower ball mount platform and secured to clevis/ball mount assembly 550 with clevis pin 50.

FIG. 25 is an example of an alternate design of accessory attachment assembly 525 referred to by Reference No. 600. In this embodiment, accessory attachment assembly 525 is comprised of an accessory/tow ball base 602 configured like an H-beam comprising upper flange 620, lower flange 630, and web 640. The distance between upper flange 620 and lower flange 630 is sized so that when accessory/tow ball base 602 engages clevis/ball mount assembly 550, upper flange 620 and lower flange 630 straddle the sides of upper ball mount platform 20 and lower ball mount platform 30 preventing accessory/tow ball base 602 from rotating. Web 640 comprises aperture 642 for enabling clevis pin 50 to pass through accessory/tow ball base 602 when pinning accessory/tow ball base 602 to clevis/ball mount assembly 550. Web 640 may also comprise hollow sleeve 645 as shown. The length of hollow sleeve 645 is sized to fit between upper ball mount platform 20 and lower ball mount platform 30 with minimal clearance. Hollow sleeve 645 prevents accessory/tow ball base 602 from moving up or down or side to side between ball mount platforms 20 and 30.

Any combination of the clevis/ball hitch pins 50 and hitch balls 40 disclosed and described in Assembly 100 of this application may be applied to the embodiments of Assemblies 200 and 300, 400, 500 and 600 of this application.

As can be recognized and appreciated by one skilled in the art, while the embodiments of this invention are described and illustrated as assemblies that engage a vehicle's existing hitch receiver or hitch mounting surface, the attachment element of any of the embodiments of this invention may be modified to accommodate the assembly being attached directly to a specific tow vehicle such as by being bolted or welded to the vehicle and becoming a feature of the vehicle, rather than an accessory removably attached to a vehicle.

It is to be understood that the present invention is not limited to the embodiments described above but encompasses any and all embodiments within the scope of the following claims.

The invention claimed is:

1. A hitch assembly, comprising:
a housing bracket having side members and a connecting member;
a lower platform attached to the housing bracket such that a cavity is formed between the lower platform and the connecting member;
an upper platform configured to removably engage the cavity; and
a mounting bracket connected to the housing bracket and having at least one adjustment aperture, wherein the mounting bracket is U-shaped.

2. The assembly of claim 1, wherein the housing bracket is U-shaped.

3. The assembly of claim 1, wherein the lower platform is non-removably connected to the housing bracket.

4. The assembly of claim 1, wherein the upper platform is "L"-shaped and one leg of which is configured to engage the cavity formed between the lower platform and the connecting member.

5. The assembly of claim 1, including a vertical hitch shank having a plurality of apertures, with the mounting bracket configured to engage the hitch shank.

6. The assembly of claim 1, including a clevis pin attached to one platform and extending between the upper and lower platforms.

7. The assembly of claim 6, including a tow ball attached to at least one of the upper and lower platforms.

8. The assembly of claim 1, including a tow ball attached to at least one of the upper and lower platforms.

9. The assembly of claim 8, including a clevis pin attached to one platform and extending between the upper and lower platforms.

10. A hitch assembly, comprising:
a housing bracket having side members and a connecting member;
a lower platform attached to the housing bracket such that a cavity is formed between the lower platform and the connecting member;
an upper platform configured to removably engage the cavity; and
a mounting bracket connected to the housing bracket and having at least one adjustment aperture, wherein the upper platform and the lower platform each include throughbores that align when the upper platform is inserted into the cavity.

11. The assembly of claim 10, including a clevis pin configured to engage the throughbores.

12. The assembly of claim 11, including a tow ball attached to at least one of the upper and lower platforms.

13. The assembly of claim 12, wherein the tow ball includes a base having a vertical blind bore and an end of the clevis pin is configured to engage the blind bore on the tow ball base.

14. The assembly of claim 10, including a clevis pin configured to engage at least one of the throughbores.

15. A hitch assembly, comprising:
a U-shaped housing bracket having side members and a connecting member, a set of aligned apertures formed in the side members;
a lower platform non-removably connected to the housing bracket such that a cavity is formed between a vertical leg of the lower platform and the connecting member of the housing bracket, wherein the lower platform includes a throughbore;

an L-shaped upper platform having one leg configured to removably engage the cavity, wherein the upper platform includes a throughbore;

a U-shaped mounting bracket having side members and a connecting member, with the connecting member of the mounting bracket attached to the connecting member of the housing bracket, and wherein the sides of the mounting bracket include at least one set of aligned apertures; and a vertical hitch shank having a plurality of apertures, wherein the mounting bracket is configured to engage the hitch shank such that the vertical position of the housing bracket and mounting bracket is selectively adjustable.

16. A hitch assembly, comprising:

a shank having a first end and a second end;

a first platform attached to the second shank end and having a throughbore;

a second platform attached to the second shank end and having a throughbore, with the second platform spaced from the first platform such that the throughbores are aligned;

a tow ball comprising a base and a ball sphere attached to one of the platforms, the tow ball including a horizontal bore extending through the base and a vertical blind bore aligned with the throughbores of the first and second platforms;

a clevis pin having a first end, a second end, and a throughbore, wherein the clevis pin is insertable into the aligned throughbores of the first and second platforms such that an end of the clevis pin engages the vertical blind bore of the tow ball and the horizontal bore aligns with the clevis pin throughbore; and a retaining pin configured to engage the aligned horizontal tow ball bore and clevis pin throughbore.

17. The assembly of claim 16, wherein at least one platform is removable.

18. The assembly of claim 16, wherein one platform is movable with respect to the other platform.

19. A hitch assembly, comprising:

a U-shaped housing bracket having side members including a set of aligned apertures, a closed forward connecting member end, and an open rearward end;

an L-shaped lower platform comprising a vertical section and a horizontal section, with the vertical section permanently attached directly to the rearward ends of the housing bracket side members such that a cavity is formed between the vertical section of the lower platform and the forward connecting member end of the housing bracket;

an L-shaped upper platform configured to removably engage the cavity and be pinned to the assembly via aligned apertures in the housing side members; and a mounting bracket permanently attached directly to the closed forward end of the housing bracket.

20. The assembly of claim 19, wherein the mounting bracket comprises a U-shaped mounting bracket having side members including at least one set of aligned apertures, an open forward end, and a closed rearward connecting member end permanently attached directly to the forward end of the housing bracket.

21. The assembly of claim 20, further including a vertical hitch shank having a plurality of apertures, with the mounting bracket configured to engage the vertical hitch shank.

22. The assembly of claim 19, wherein the mounting bracket is a shank comprising at least one set of aligned apertures in opposing sides, said mounting bracket configured to engage a vehicle hitch receiver.

* * * * *